US007900838B2

(12) United States Patent
Hamada et al.

(10) Patent No.: US 7,900,838 B2
(45) Date of Patent: Mar. 8, 2011

(54) FORM EDITING APPARATUS, CONTROL METHOD, AND STORAGE MEDIUM

(75) Inventors: Noboru Hamada, Kawasaki (JP); Naohiro Taguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 698 days.

(21) Appl. No.: 11/958,212

(22) Filed: Dec. 17, 2007

(65) Prior Publication Data

US 2008/0150967 A1    Jun. 26, 2008

(30) Foreign Application Priority Data

Dec. 21, 2006 (JP) ................................. 2006-344267
Dec. 3, 2007 (JP) ................................. 2007-312406

(51) Int. Cl.
G06K 7/10 (2006.01)
G06K 9/18 (2006.01)

(52) U.S. Cl. .......... 235/462.09; 235/462.01; 235/462.08; 235/487; 235/492

(58) Field of Classification Search ............. 235/462.01, 235/462.08, 462.09, 487, 492
See application file for complete search history.

(56) References Cited

U.S. PATENT DOCUMENTS

| 6,683,585 | B1 * | 1/2004 | Nakano ........................... 345/10 |
| 2002/0060246 | A1 * | 5/2002 | Gobburu et al. ......... 235/462.46 |
| 2002/0191108 | A1 * | 12/2002 | Ko .................................. 348/569 |
| 2003/0058261 | A1 * | 3/2003 | Challa et al. ................... 345/690 |
| 2005/0040239 | A1 * | 2/2005 | Durbin ....................... 235/472.01 |
| 2005/0077361 | A1 * | 4/2005 | Sakai et al. ..................... 235/487 |
| 2005/0156879 | A1 * | 7/2005 | Honda et al. ................... 345/156 |

FOREIGN PATENT DOCUMENTS

| JP | 2000-076372 A | 3/2000 |
| JP | 2001-045262 A | 2/2001 |

* cited by examiner

*Primary Examiner* — Michael G Lee
*Assistant Examiner* — Ali Sharifzada
(74) *Attorney, Agent, or Firm* — Canon USA, Inc. IP Division

(57) ABSTRACT

An apparatus includes a generation unit configured to encode data and generate a two-dimensional code image; a clipping unit configured to clip an image which fits in a two-dimensional code image display area, from the two-dimensional code image generated by the generation unit; a first display control unit configured to display the image clipped by the clipping unit in the two-dimensional code image display area; a change unit configured to change a size of the two-dimensional code image display area to be equal to or larger than a size of the two-dimensional code image generated by the generation unit according to an instruction from a user; and a second display control unit configured to display the two-dimensional code image generated by the generation unit in the two-dimensional code image display area whose size is changed by the change unit.

6 Claims, 8 Drawing Sheets

FIG.7

| BANK TRANFER STATEMENT | | | | 700 |

| COMPANY NAME | 1111 |
|---|---|
| CREATION DATE | 2005/12/31 |

| TRANSFER DATE | BENEFICIARY NAME | AMOUNT | REMARKS |
|---|---|---|---|
| 2005/1/1 | 2222 | ¥105 | N/A |

BANK TRANFER STATEMENT ~800

| COMPANY NAME | 1111 |
|---|---|
| CREATION DATE | 2005/12/31 |

| TRANSFER DATE | BENEFICIARY NAME | AMOUNT | REMARKS |
|---|---|---|---|
| 2005/1/1 | 2222 | ¥105 | N/A |
| 2005/2/1 | 2222 | ¥124 | N/A |
| 2005/3/1 | 2222 | ¥3,150 | N/A |
| 2005/4/1 | 2222 | ¥2,100 | N/A |
| 2005/5/1 | 2222 | ¥10,500 | N/A |

FORM EDITING APPARATUS, CONTROL METHOD, AND STORAGE MEDIUM

BACKGROUND OF THE INVENTION

1. Field of the Invention

The present invention relates to an apparatus capable of generating a form including a two-dimensional code image, a control method, a program, and a storage medium.

2. Description of the Related Art

A technique is known by which original data is acquired from a coded image. According to this technique, the original data is encoded into a coded image, the coded image is printed on a sheet of paper, and the original data is acquired by scanning the coded image with a reader.

As a method to print original data on a sheet of paper using encoded original data, two-dimensional codes such as a bar code for commodity management or a QR code and a digital watermark are known. All of these codes and marks will be referred to as "two-dimensional code images" in the context of the present specification.

Suppose a user needs to create a form including a two-dimensional code image, there is a form creation application which has a function of inserting an image in the form. Thus, it is natural for the user to create a form that includes a two-dimensional code image using a form creation application which has a function of inserting a two-dimensional code image.

A layout of a two-dimensional code image is limited by an overall layout of a form. This is because the two-dimensional code image needs to be inserted in a manner so that the two-dimensional code image does not overlap an image in an area other than the two-dimensional code image. This is especially apparent in a case where the layout of the form is fixed. This limitation of the layout will be described below referring to, as an example, a layout of a bank transfer statement which is a transfer record forwarded from a bank to a client company.

In a form layout illustrated in FIG. 1, a two-dimensional code image display area 103 configured to display encoded content data is arranged in the middle of the layout so that a person in charge in a client company can easily retrieve content data contained in the form when the person receives the form.

Other fields that make up a bank transfer statement 100 are a creation date field 101 where a date and time of creation of the form is input, a company name field 102 where a name of a client company which receives the form is input, and a detail information field 104 where each bank transfer processing result is listed. The date and time, company name, and bank transfer processing results which are input in these fields 101, 102, and 104, are examples of and referred to as content data in the context of the present specification.

A horizontal length of the detail information field 104 and a horizontal length of a two-dimensional code image display area 103 are fixed but their vertical length is changeable. Accordingly, if a number of items that are input in the detail information field 104 increases, a second page of the form is created. In this case, as shown in a bank transfer statement 110, a latter part of the information input in the detail information field 104 is subsequently stated on the next page.

On the other hand, a vertical length of the two-dimensional code image display area 103 which is changeable, cannot be changed without limit just because the number of items which are input into the detail information field 104 is increased. This is because it is desired that a two-dimensional code image is arranged on the first page as far as possible. If the two-dimensional code image is arranged only on the first page, the user can acquire the content data contained in the form simply by scanning the two-dimensional code image on the first page.

As described above, a certain measure needs to be taken in arranging the two-dimensional code image surely within a form under a constraint of the overall layout. A number of attempts have been made so far for that purpose.

For example, Japanese Patent Application Laid-Open No. 2000-076372 discusses a method in which original data is divided into a plurality of pieces so that an amount of each piece of data is small when the data is encoded.

In addition, Japanese Patent Application Laid-Open No. 2000-076372 discusses that a two-dimensional code image that has a fixed horizontal and vertical size has a limit on the amount of information to be contained. If the amount of data in the original data is less than the maximum data amount, the original data is encoded and one two-dimensional bar code is generated.

On the other hand, if the amount of data in the original data exceeds the maximum data amount, the original data is divided into a plurality of pieces so that each piece of data is within the volume limit. After then, the divided pieces of data are encoded and a plurality of two-dimensional code images which correspond to the divided pieces of data are generated.

According to the technique discussed in Japanese Patent Application Laid-Open No. 2000-076372, if the amount of data in the original data exceeds the maximum data amount, the original data is divided into a plurality of pieces and encoded to generate a two-dimensional bar code. Thus, when a user inputs an instruction to adjust the size of the two-dimensional code image, the above-described original data needs to be divided again to generate a new two-dimensional bar code. However, encoding of data requires considerable processing time, therefore, the user may get frustrated when data needs to be encoded once again.

Therefore, there is a strong demand for a form editing apparatus which is capable of displaying a two-dimensional code image in a two-dimensional code image display area without regenerating the two-dimensional code image from the original data even if a horizontal size or a vertical size of the two-dimensional code image display area is changed in response to a request from the user.

SUMMARY OF THE INVENTION

An embodiment of the present invention is directed to a form editing apparatus capable displaying a two-dimensional code image in a two-dimensional code image display area without regenerating the two-dimensional code image.

According to an aspect of the present invention, an embodiment is directed to an apparatus including a generation unit configured to encode data and generate a two-dimensional code image; a clipping unit configured to clip an image which fits in a two-dimensional code image display area, from the two-dimensional code image generated by the generation unit; a first display control unit configured to display the image clipped by the clipping unit in the two-dimensional code image display area; a change unit configured to change a size of the two-dimensional code image display area to be equal to or larger than a size of the two-dimensional code image generated by the generation unit, according to an instruction from a user after control is exerted to perform display by the first display control unit; and a second display control unit configured to display the two-dimensional code image generated by the generation unit in the two-dimensional code image display area whose size is changed by the change unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of an image displayed in step 508 in FIG. 5 after a position of the two-dimensional code image display area is changed.

FIG. 8 is an example of an image displayed in step 500 illustrated in FIG. 5.

DETAILED DESCRIPTION OF THE EMBODIMENTS

Various exemplary embodiments, features, and aspects of the invention will be described in detail below with reference to the drawings.

The present exemplary embodiment will be described referring to a bank transfer statement 100 which is an example of a form layout information illustrated in FIG. 1.

Figure 3:
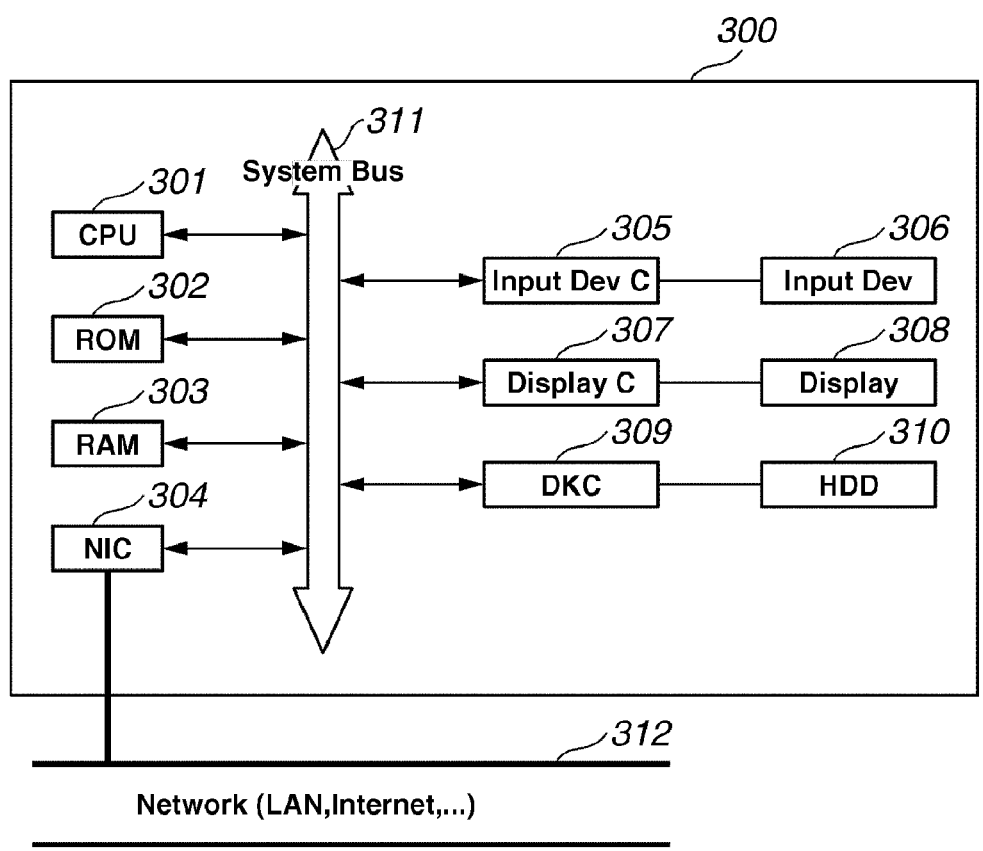
FIG. 3 illustrates a configuration of a form editing apparatus according to an exemplary embodiment of the present invention.

FIG. 3 illustrates an example configuration of a form editing apparatus configured to generate a form based on the form layout information.

A form editing apparatus 300 includes a central processing unit (CPU) 301 configured to execute software stored in a read only memory (ROM) 302 or a high-capacity storage apparatus such as a hard disk drive (HDD) 310. The CPU 301 comprehensively controls each device connected to a system bus 311.

Content data and form layout information are stored in advance in the HDD 310. A disk controller (DKC) 309 controls the HDD 310.

A random access memory (RAM) 303 functions as a main memory and a work area of the CPU 301. An external input controller (Input Dev C) 305 receives an instruction from an input unit (Input Dev) 306 provided in the form editing apparatus and notifies the CPU 301 that the Input Dev C 305 has received the instruction. The input unit 306 includes, for example, a keyboard, and a mouse. A display controller (Display C) 307 controls display of a display unit (Display) 308 which includes, for example, a liquid crystal display.

A network interface card (NIC) 304 is used when the form editing apparatus 300 exchanges data bi-directionally with another network apparatus or a file server through a network 312.

The HDD 310 can also be used as a temporary storage location during processing.

Next, a generation processing of a two-dimensional code image and a two-dimensional code image display processing will be described. A form is created through the processing.

In the following description, the determination and processing is executed by the CPU 301 based on a program stored, for example, in the ROM 302 or the HDD 310 in FIG. 3. Further, data generated by the CPU 301 during processing such as encoding, clipping or displaying of two-dimensional code image is temporarily stored in the RAM 303 or the HDD 310.

Figure 1:
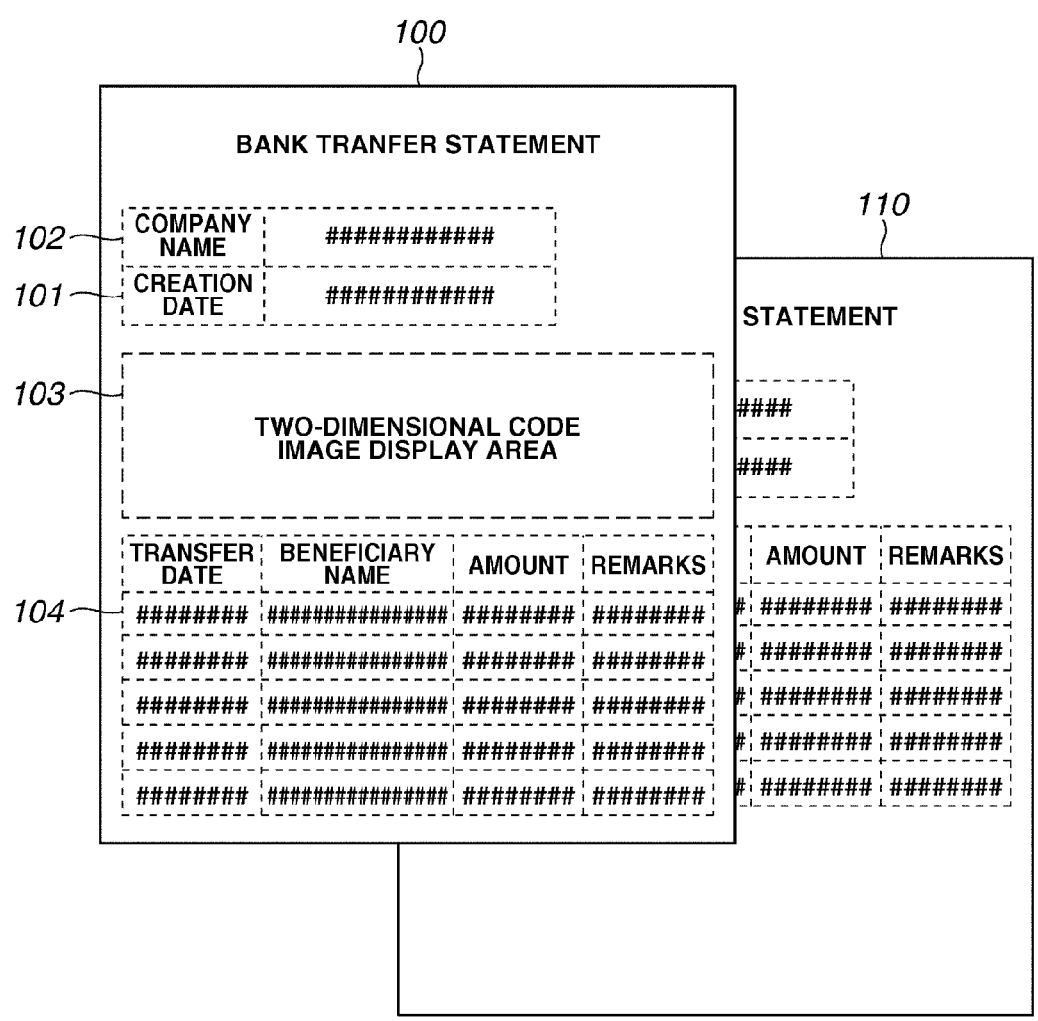
FIG. 1 illustrates an example of a form layout.

The form layout information illustrated in FIG. 1 is set in advance by a person in charge of creating a form layout. As described above, the form layout information is stored in the HDD 310.

Default arrangement positions of a creation date field 101, a company name field 102, and a detail information field 104 are included in the form layout information according to the present exemplary embodiment. Further, default arrangement position information (vertical start position, vertical length, horizontal start position, and horizontal length) of the two-dimensional code image display area 103 is included in this form layout information. Furthermore, information that the vertical start position and the vertical length of the default arrangement positions are changeable but the horizontal start position and the horizontal length of the default arrangement positions are fixed, is also included in this form layout information.

Figure 4:
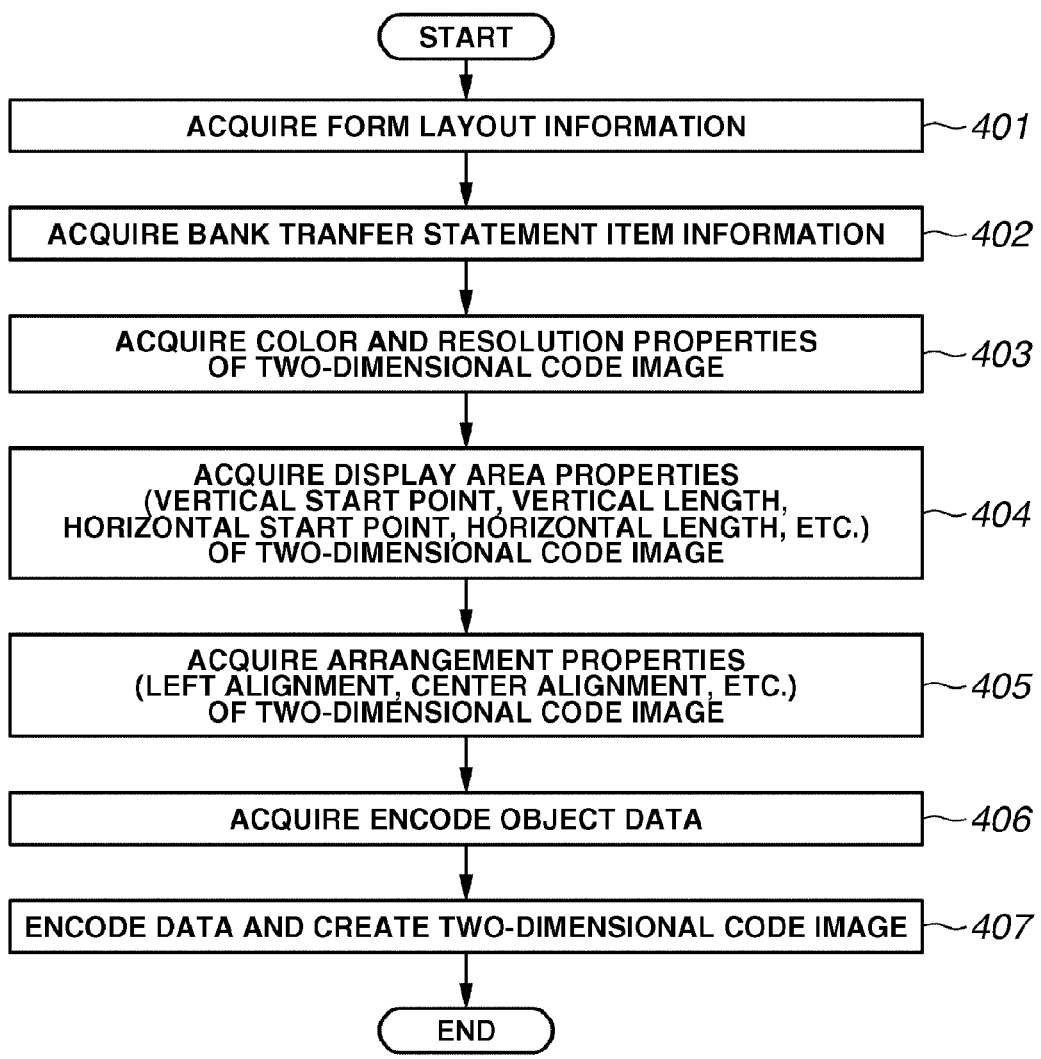
FIG. 4 is a flowchart illustrating a generation processing of the two-dimensional code image according to an exemplary embodiment of the present invention.

A flowchart illustrated in FIG. 4 starts when the CPU 301 receives an instruction from the user to generate a bank transfer statement 100.

In step 401, the CPU 301 acquires the form layout information stored in the HDD 310.

In step 402, the CPU 301 acquires content data to be input in the creation date field 101, the company name field 102, and the detail information field 104. Then, the CPU 301 inputs the acquired data in each field. The table below illustrates an example of the creation date field 101, the company name field 102, and the detail information field 104 filled with content data.

TABLE 1

| Company Name | 1111 | | |
|---|---|---|---|
| Creation Date | 2005 Dec. 31, | | |
| Date of Transfer | Beneficiary Name | Amount | Remarks |
| 2005 Jan. 1, | 2222 | ¥105 | N/A |
| 2005 Feb. 1, | 2222 | ¥124 | N/A |
| 2005 Mar. 1, | 2222 | ¥3,150 | N/A |
| 2005 Apr. 1, | 2222 | ¥2,100 | N/A |
| 2005 May 1, | 2222 | ¥10,500 | N/A |

In step 403, the CPU 301 acquires a color and a resolution property of the two-dimensional code image to be generated. The color property of the two-dimensional code image is, for example, whether the two-dimensional code image is color or monochrome. The properties of the two-dimensional code image can be included in the form layout information which is stored in advance in the HDD 310 or set by the user dialogically each time the bank transfer statement is generated.

In step 404, the CPU 301 acquires a property of the two-dimensional code image display area 103 from the form layout information stored in the HDD 310. This property includes information such as default arrangement of the two-dimensional code image display area 103 (vertical start position, vertical length, horizontal start position, and horizontal length) and whether the vertical start position, vertical length, horizontal start position, or horizontal length is changeable. Thus, according to an exemplary embodiment, this property includes information of the default arrangement of the two-dimensional code image display area 103 and information that the vertical length of the two-dimensional code image area 103 is changeable but the horizontal length is fixed.

In step 405, the CPU 301 acquires a property of an arrangement of the two-dimensional code image in the two-dimensional code image display area 103. The arrangement of the two-dimensional code image in the two-dimensional code image display area 103 includes nine patterns of arrangement, i.e. three patterns (left alignment, center alignment, and right alignment) for each of three patterns (top alignment, vertically center alignment, and bottom alignment). The property of the arrangement of the two-dimensional code image can be included in the form layout information but can also be set by the user each time the bank transfer statement is generated.

In step 406, the CPU 301 acquires encode target data which is data of a two-dimensional code image to be encoded. According to the present exemplary embodiment, the encode target data is the entire content data acquired in step 402. However, the encode target data in the present invention is not limited to the entire content data. For example, the encode target data may be a part of the content data, or may not even be the content data.

In step 407, the CPU 301 encodes the encode target data which is acquired in step 406 and generates a two-dimensional code image 601. The color and resolution properties acquired in step 403 are used at the time the two-dimensional code image 601 is generated. Further, in step 407, the two-dimensional code image is generated so that its horizontal length is equal to or shorter than the horizontal length acquired in step 404. As described above, the horizontal length acquired in step 404 is fixed. The CPU 310 then temporarily stores the two-dimensional code image generated in step 407 in the RAM 303 or the HDD 310 as described earlier.

Figure 5:
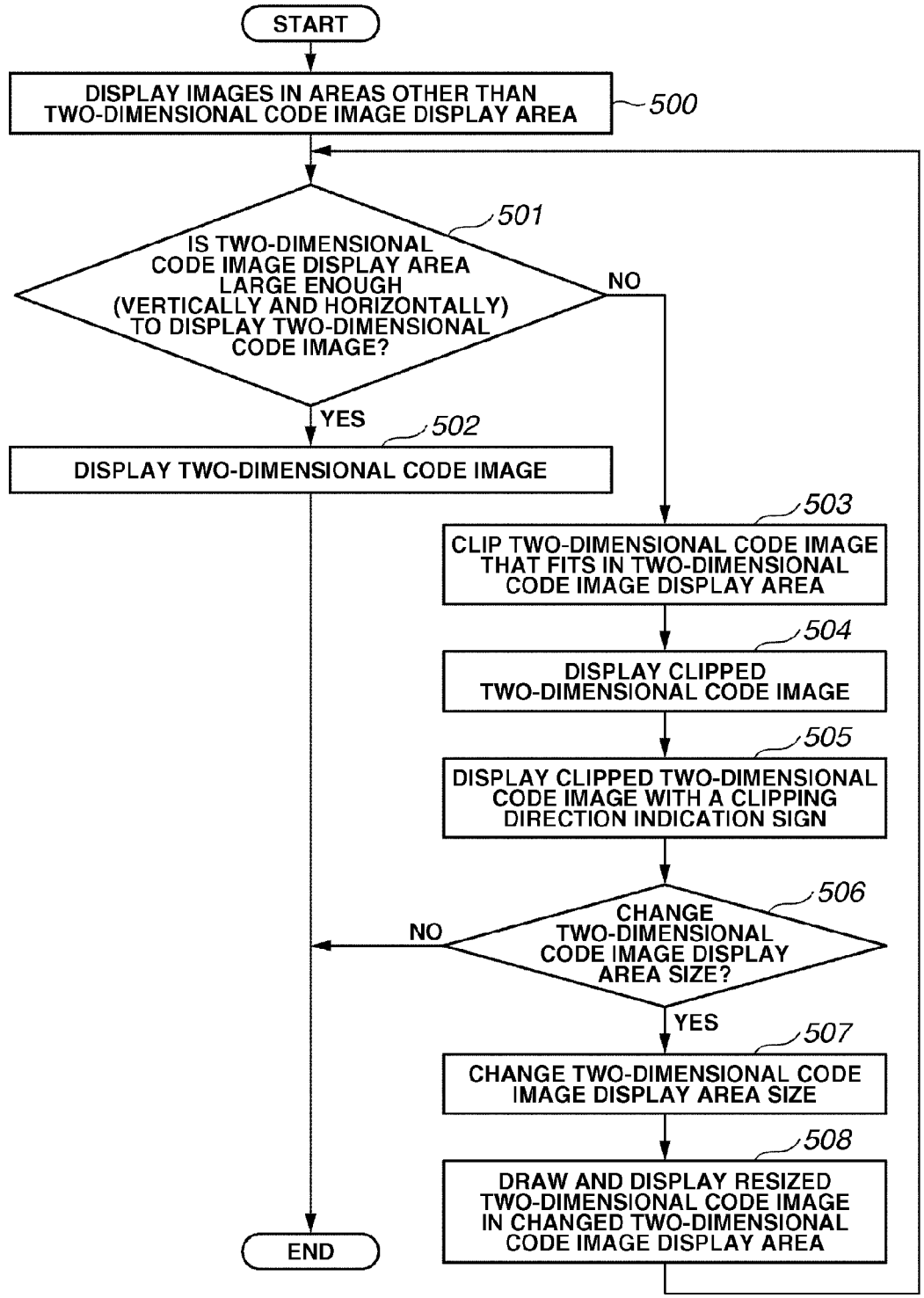
FIG. 5 is a flowchart of a two-dimensional code image display processing according to an exemplary embodiment of the present invention.

When the user gives an instruction to display the two-dimensional code image after the above-described two-dimensional code image generation processing for the generation of the bank transfer statement 100 ends, display processing of the two-dimensional code image shown in FIG. 5 is started.

In step 500, the CPU 301 displays images which are displayed in areas other than the two-dimensional code image display area 103. According to the present exemplary embodiment, the images other than the image displayed in the two-dimensional code image display area 103 are images of data input in each field in step 402. For this reason, the CPU 301 performs control to display an image, for example, an image 800 shown in FIG. 8, in step 500.

In step 501, the CPU 301 determines whether a size of the two-dimensional code image display area acquired in step 404 is large enough to display the two-dimensional code image 601 (FIG. 6) generated in step 407. To be more specific, this determination is made according to whether the vertical length of the two-dimensional code image display area, which is changeable, is longer than the vertical length of the two-dimensional code image 601 generated in step 407.

In other words, if the vertical length of the two-dimensional code image display area is equal to or longer than the vertical length of the two-dimensional code image 601, then in step 501, the CPU 301 determines that the size of the two-dimensional code image display area is large enough. If the vertical length of the two-dimensional code image display area is shorter than the two-dimensional code image 601, then in step 501, the CPU 301 determines that the size of the two-dimensional code image display area is not large enough.

If the CPU 301 determines that the size of the two-dimensional code image display area is large enough to display the two-dimensional code image 601 generated in step 407 (YES in step 501), then the process proceeds to step 502. On the other hand, if the CPU 301 determines that the size is not large enough (NO in step 501), then the process proceeds to step 503.

In step 502, the CPU 301 receives the two-dimensional code image 601 generated in step 407 from the RAM 303 or the HDD 310, arranges and displays it on a two-dimensional code image display area 602. The processing ends when the process in step 502 ends. It is to be noted that, in step 502, the two-dimensional code image 601 is arranged and displayed in the two-dimensional code image display area 602 with its property adjusted to the arrangement property of the two-dimensional code image acquired in step 405.

In step 503, the CPU 301 clips an image whose size is appropriate for the two-dimensional code image display area 602, from the two-dimensional code image 601 generated in step 407. In other words, the CPU 301 clips an image which fits in the two-dimensional code image display area 602 (FIG. 6), from the two-dimensional code image 601 generated in step 407.

Figure 2A:
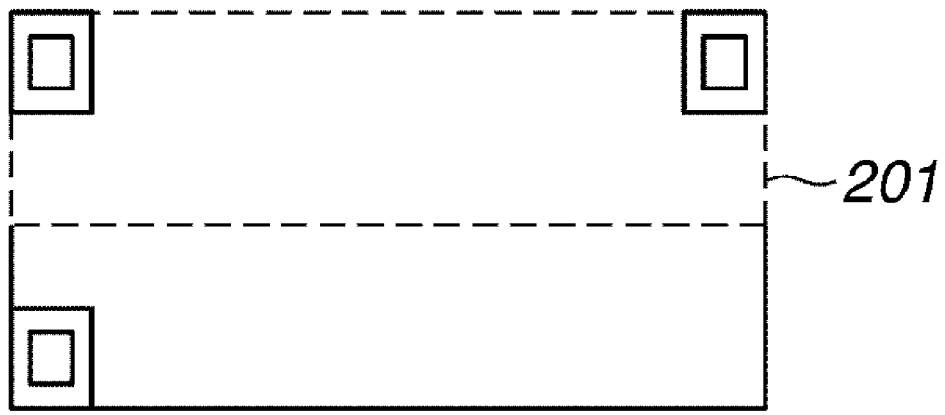
FIG. 2A is a two-dimensional code image illustrating that an upper part of the two-dimensional code image is to be clipped.
Figure 2B:
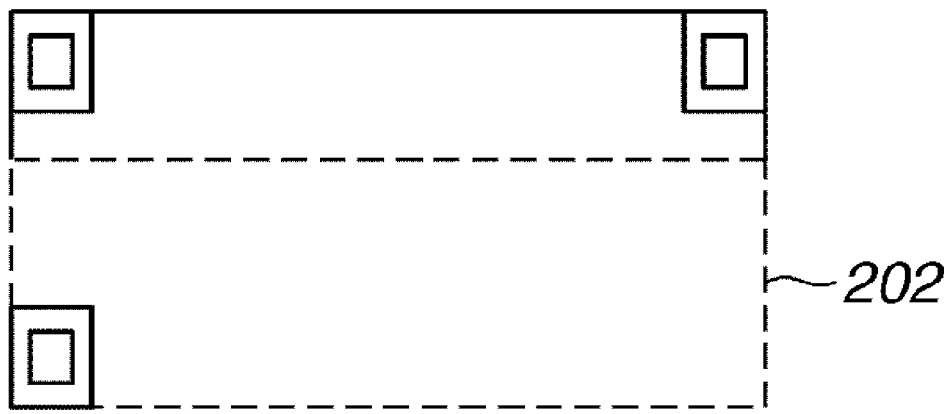
FIG. 2B is a two-dimensional code image illustrating that a lower part of the two-dimensional code image is to be clipped.

The area to be clipped is determined based on the arrangement property of the two-dimensional code image acquired in step 405. For example, if a property such as top alignment and left alignment is acquired, an upper part of the two-dimensional code image is clipped as shown by a dotted line 201 in FIG. 2A. On the other hand, if a property such as bottom alignment and left alignment is acquired, a lower part of the two-dimensional code image is clipped as shown by a dotted line 202 in FIG. 2B.

In step 504, the CPU 301 displays a partial two-dimensional code image 605 (FIG. 6) which is acquired by clipping the two-dimensional code image 601 in step 503, in the two-dimensional code image display area 602.

Figure 6:
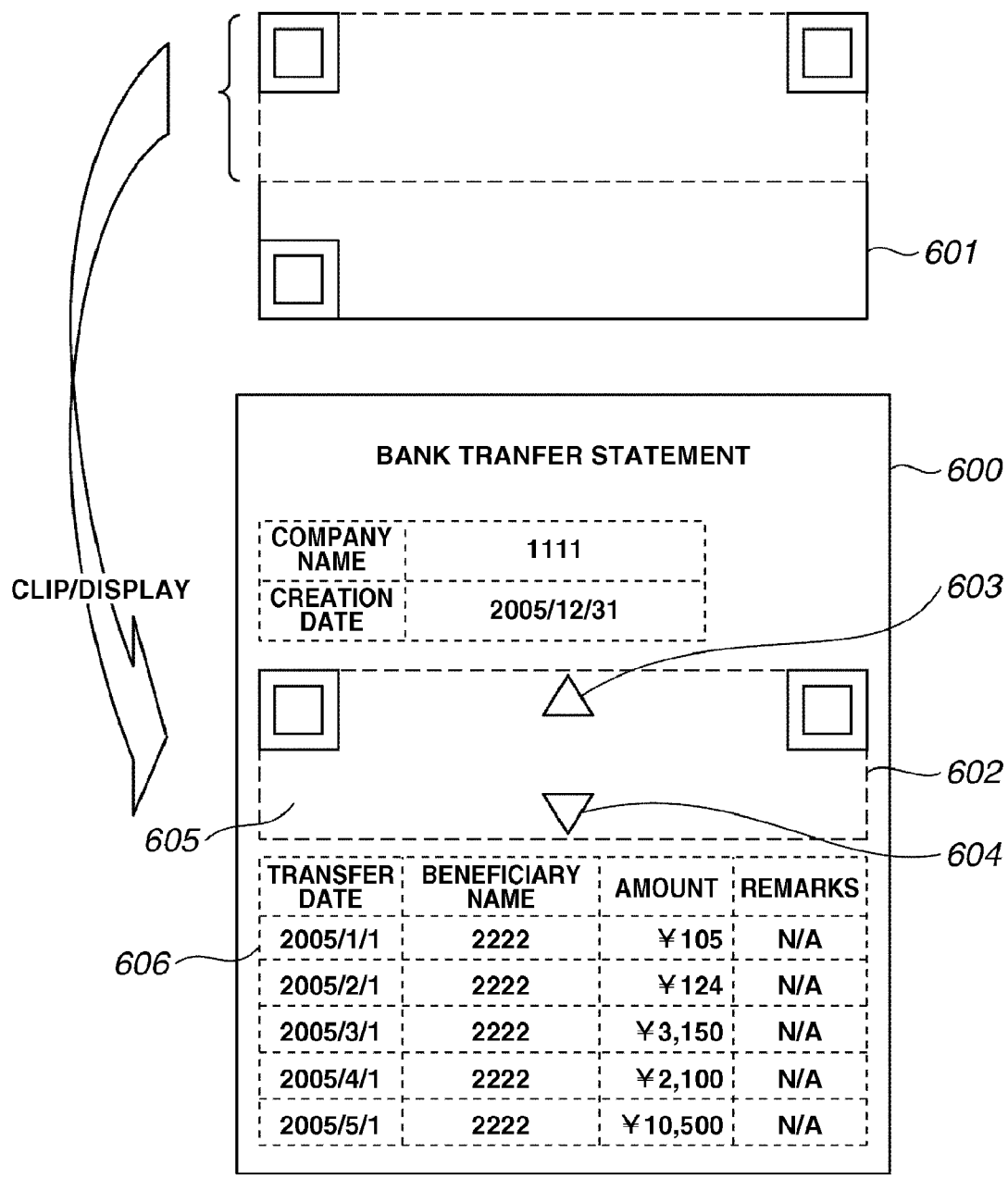
FIG. 6 illustrates a clipping direction indication sign.

In step 505, the CPU 301 superposes (synthesizes) a clipping direction indication sign 603 or a clipping direction indication sign 604 which indicates a clipping direction of the two-dimensional code image clipped in step 503, on the two-dimensional code image displayed in step 504. The user is able to know the clipping direction by these clipping direction indication signs. A bank transfer statement 600 in FIG. 6 is displayed in this stage.

As described above, the clipping direction indication signs 603 and 604 indicate a direction in which the two-dimensional code image 601 is clipped. Simultaneously, the clipping direction indication signs 603 and 604 indicate that the two-dimensional code image display area 602 can be extended or contracted in a direction which the signs point. In other words, the clipping direction indication signs 603 and 604 indicate that the two-dimensional code image display area 602 cannot be extended or contracted in a direction which the signs do not point. Simultaneously, the clipping direction indication signs 603 and 604 remind the user that the size (for example, vertical length) of the two-dimensional code image display area 602 needs to be changed.

In step 506, the CPU 301 determines whether a size adjustment order of the display area 602 is requested by the user. To input an instruction to change a size, the user can, for example, drag a border of the two-dimensional code image display area 602 displayed on the Display 308 to adjust its size with the input unit 306 (i.e., a mouse or the like). Generally, the above-described operation is performed after the two-dimensional code image display area 602 is selected by the input unit 306, for example, by a click operation of the mouse. Thus, a presence of the size change request input by the user can be determined by checking, for example, whether the two-dimensional code image display area 602 has a focus, (i.e., the area is in a selected state).

For example, if an instruction to extend the vertical length of the two-dimensional code image display area 602 longer than the two-dimensional code image 601 is inputted by the user, the process of the flowchart will proceed in an order of step 507→step 508→step 501→step 502→end. In other words, if an instruction to extend the size of the two-dimensional code image display area 602 larger than or equal to the two-dimensional code image 601 is inputted by the user in step 506, the process of the flowchart will proceed in an order of step 507→step 508→step 501→step 502→end.

In step 507, if an instruction to extend the vertical length of the two-dimensional code image display area 602 longer than the two-dimensional code image 601 is inputted by the user in step 506, the CPU 301 executes the processing as instructed. In other words, if the above-described instruction is inputted, in step 507, the CPU 301 extends the vertical length of the two-dimensional code image display area 602 longer than or equal to the vertical length of the two-dimensional code image 601.

If the CPU 301 determines that the user has not entered an instruction to change the size of the two-dimensional code image display area 602 (NO in step 506), the process ends. If the CPU 301 determines that the user has entered an instruction to change the size of the two-dimensional code image display area 602 (YES in step 506), the process proceeds to step 507.

In step 507, the CPU 301 changes the two-dimensional code image display area 602 according to the size instructed by the user.

In step 508, the CPU 301 lays out the bank transfer statement 600 again according to the size change of the two-dimensional code image display area 602 in step 507. Then the CPU 301 displays the entire bank transfer statement and the process returns to step 501. To be more specific, in step 508, the CPU 301 white paints the entire display area, and then, changes the arrangement of areas other than the two-dimensional code image display area 602. For example, if the two-dimensional code image display area 602 is extended downward, the arrangement position of a field that should be below the field 602 (for example, a detailed display field 606) is moved downward.

Further, for example, if the two-dimensional code image display area 602 is extended upward, the arrangement position of a field that should be above the two-dimensional code image display area 602 (for example, the creation date field 101 and the company name field 102) is moved upward.

If the two-dimensional code image display area 602 is overextended upward, however, the arrangement position of a field that should be above the two-dimensional code image display area 602 may not fit in one page.

Thus, according to an exemplary embodiment, if the two-dimensional code image display area 602 is overextended upward, the field that should be above the two-dimensional code image display area 602 is moved to the preceding page. Then, the arrangement position of the two-dimensional code image display area 602 is adjusted upward or moved up in the current page as instructed by the user.

Instead of moving the field that should be above the two-dimensional code image display area 602 to the preceding page and arranging the two-dimensional code image display area 602 in the current page, the following processing can also be executed. To be more specific, the field that should be above the two-dimensional code image display area 602 can be arranged in the current page and the two-dimensional code image display area 602 can be moved to the subsequent page.

More specifically, in step 508, in which the CPU 301 lays out again according to the size change of the two-dimensional code image display area performed in step S507, the CPU 301 executes the following processing.

First, the CPU 301 determines whether the two-dimensional code image display area is moved upward or downward.

Next, if the CPU 301 determines that the two-dimensional code image display area is moved downward, then the arrangement position of a field that should be below the two-dimensional code image display area 602 is moved downward. At this time, if the field that should be below the two-dimensional code image display area 602 does not fit in the current page, the field is moved to the subsequent page.

If the CPU 301 determines that the two-dimensional code image display area is moved upward, the CPU 301 executes the following processing.

First, the CPU 301 determines whether the field that should be above the two-dimensional code image display area 602 fits in the current page.

If the CPU 301 determines that the field that should be above the two-dimensional code image display area 602 fits in the current page, the arrangement position of the field is moved upward.

If the CPU 301 determines that the field that should be above the two-dimensional code image display area 602 does not fit in the current page, the arrangement position of the field is moved to the preceding page. Alternatively, the arrangement position of the field is arranged in the current page and the two-dimensional code image display area 602 is moved to the subsequent page.

FIG. 7 illustrates an example of a screen displayed in step 508. In FIG. 7, an image 700 whose detailed display field 702 is moved down when the two-dimensional code image display area 602 is changed to a lower side in step 507. In step 508, the two-dimensional code image display area and the entire display area including the areas other than the two-dimensional code image display area are white-painted (deleted), and then the images of areas other than the two-dimensional code image display area are displayed again. Thus, in step 508, the display of the two-dimensional code image display area, the two-dimensional code image displayed in the two-dimensional code image display area, and the clipping direction indication signs are cancelled.

As described above, according to an embodiment, a two-dimensional code image is generated, the generated two-dimensional code image is clipped so that it fits the two-dimensional code image display area, and the clipped two-dimensional code image is displayed. Then, the user can arrange to change a position of the two-dimensional code image display area. For example, the user can arrange the position of the two-dimensional code image display area to be in an upper side or a lower side.

Further, if the user inputs a request to rearrange the position of the two-dimensional code image display area, the rearrangement can be performed only by clipping the two-dimensional code image as described in FIG. 6 and another encoding processing is not necessary (no need to create two-dimensional code image again). This helps reduce processing time, thereby lessening waiting time for the user.

Furthermore, according to an exemplary embodiment, the user can exactly confirm overall color, density, and layout of the form in step 504 by displaying partial two-dimensional code image 605 in the two-dimensional code image display area 602, prior to inputting the size change request. If the partial two-dimensional code image 605 is not displayed in step 504 and only a border of the two-dimensional code image display area 602 is displayed, the user is unable to confirm the overall density of the form. If the overall density of the form cannot be confirmed, the user is unable to have an overall impression of the form. Accordingly, in the present exemplary embodiment, the partial two-dimensional code image 605 is displayed in the two-dimensional code image display area 602 in step 504.

Embodiments of the present invention can be achieved by a computer (or a CPU or a MPU) reading and executing a program code which realizes a procedure of the flowcharts in the aforementioned embodiment from a storage medium. In this case, the program code which is read from the storage medium itself realizes a function of the aforementioned embodiment. Thus, the program code and the storage medium that stores the program code also fall within the scope of the present invention As a storage medium which provides the program code, a floppy disk, a hard disk, an optical disk, a magneto-optical disk, a CD-ROM, a CD-R, a magnetic tape, a non-volatile memory card, or a ROM, etc. may be used.

Further, although the vertical length of the two-dimensional code image display area is changeable and the horizontal length is fixed according to the above described exemplary embodiment, an embodiment of the present invention can also be achieved when the vertical length is fixed and the horizontal length is changeable.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2006-344267 filed Dec. 21, 2006 and No. 2007-312406 filed Dec. 3, 2007, which are hereby incorporated by reference herein in their entirety.

What is claimed is:

1. A two-dimensional code display apparatus comprising:
   a generating unit configured to encode received data and generate a two-dimensional code image;
   a clipping unit configured to clip an image that fits in a two-dimensional code image display area from the two-dimensional code image generated by the generating unit;
   a display control unit configured to perform control to display the image clipped by the clipping unit in the two-dimensional code image display area;
   a changing unit configured to change, upon receipt of an instruction from a user after display is controlled by the display control unit, in accordance with the instruction, a size of the two-dimensional code image display area to be greater than or equal to a size of the two-dimensional code image generated by the generating unit; and
   a second display control unit configured to perform control to display the two-dimensional code image generated by the generating unit within the two-dimensional code image display area whose size has been changed by the changing unit,
   wherein the display control unit further performs control to display a sign indicating in which direction with respect to the two-dimensional code image display area a portion of the two-dimensional code image generated by the generating unit, which is not displayed in the two-dimensional code image display area, exists.

2. A two-dimensional code display apparatus comprising:
   a setting unit configured to set a longitudinal length and a lateral length of a two-dimensional code image display area and also set the longitudinal length to be changeable and the lateral length to be fixed, in accordance with an instruction from a user;
   a generating unit configured to encode received data and generate a two-dimensional code image so that a lateral length of the two-dimensional code image is equal to the set length;
   a clipping unit configured to clip an image having a longitudinal length and a lateral length that are equal to the set lengths, from the two-dimensional code image generated by the generating unit;
   a display control unit configured to perform control to display the image clipped by the clipping unit in the two-dimensional code image display area;
   a changing unit configured to change, upon receipt of an instruction from a user after the clipped image is displayed by the display control unit in accordance with the instruction, the longitudinal length of the two-dimensional code image display area, which is set to be changeable, to be greater than or equal to a longitudinal length of the two-dimensional code image generated by the generating unit; and
   a second display control unit configured to perform control to display the two-dimensional code image generated by the generating unit within the two-dimensional code image display area whose length has been changed by the changing unit,
   wherein the display control unit further performs control to display a sign indicating in which direction with respect to the two-dimensional code image display area a portion of the two-dimensional code image generated by the generating unit, which is not displayed in the two-dimensional code image display area, exists.

3. A two-dimensional code display apparatus comprising:
   a setting unit configured to set a lateral length and a longitudinal length of a two-dimensional code image display area and also set the lateral length to be changeable and the longitudinal length to be fixed, in accordance with an instruction from a user;
   a generating unit configured to encode received data and generate a two-dimensional code image so that a longitudinal length of the two-dimensional code image is equal to the set length;
   a clipping unit configured to clip an image having a longitudinal length and a lateral length that are equal to the set lengths, from the two-dimensional code image generated by the generating unit;
   a display control unit configured to perform control to display the image clipped by the clipping unit in the two-dimensional code image display area;
   a changing unit configured to change, upon receipt of an instruction from a user after the clipped image is displayed by the display control unit, in accordance with the instruction, the lateral length of the two-dimensional code image display area, which is set to be changeable, to be greater than or equal to a lateral length of the two-dimensional code image generated by the generating nit; and a second display control unit configured to perform control to display the two-dimensional code image generated by the generating unit within the two-dimensional code image display area whose length has been changed by the changing unit, wherein the display control unit further performs control to display a sign indicating in which direction with respect to the two-dimensional code image display area a portion of the two-dimensional code image generated by the generating unit, which is not displayed in the two-dimensional code image display area, exists.

4. A machine-readable storage medium that stores a two-dimensional code image display program that when loaded into a computer and executed, causes the computer to perform a method to display a two-dimensional code image, the method comprising:

encoding received data and generating a two-dimensional code image;

clipping an image that fits in a two-dimensional code image display area from the two-dimensional code image generated by a generating unit;

performing control to display the image clipped by a clipping unit in the two-dimensional code image display area and to further display a sign indicating in which direction with respect to the two-dimensional code image display area a portion of the two-dimensional code image generated by the generating unit, which is not displayed in the two-dimensional code image display area, exists;

changing, upon receipt of an instruction from a user after display is controlled by a display control unit, in accordance with the instruction, a size of the two-dimensional code image display area to be greater than or equal to a size of the two-dimensional code image generated by the generating unit; and performing control to display the two-dimensional code image generated by the generating unit within the two-dimensional code image display area whose size has been changed by a changing unit.

5. A machine-readable storage medium that stores a two-dimensional code image display program that when loaded into a computer and executed, causes the computer to perform a method to display a two-dimensional code image, the method comprising:

setting a longitudinal length and a lateral length of a two-dimensional code image display area and also setting the longitudinal length to be changeable and the lateral length to be fixed, in accordance with an instruction from a user;

encoding received data and generating a two-dimensional code image so that a lateral length of the two-dimensional code image is equal to the set length;

clipping an image having a longitudinal length and a lateral length that are equal to the set lengths, from the two-dimensional code image generated by a generating unit;

performing control to display the image clipped by a clipping unit in the two-dimensional code image display area and to further display a sign indicating in which direction with respect to the two-dimensional code image display area a portion of the two-dimensional code image generated by the generating unit, which is not displayed in the two-dimensional code image display area, exists;

changing, upon receipt of an instruction from a user after the clipped image is displayed by a display control unit, in accordance with the instruction, the longitudinal length of the two-dimensional code image display area, which is set to be changeable, to be greater than or equal to a longitudinal length of the two-dimensional code image generated by the generating unit; and performing control to display the two-dimensional code image generated by the generating unit within the two-dimensional code image display area whose length has been changed by a changing unit.

6. A machine-readable storage medium that stores a two-dimensional code image display program that when loaded into a computer and executed, causes the computer to perform a method to display a two-dimensional code image, the method comprising:

setting a lateral length and a longitudinal length of a two-dimensional code image display area and also setting the lateral length to be changeable and the longitudinal length to be fixed, in accordance with an instruction from a user;

encoding received data and generating a two-dimensional code image so that a longitudinal length of the two-dimensional code image is equal to the set length;

clipping an image having a longitudinal length and a lateral length that are equal to the set lengths, from the two-dimensional code image generated by a generating unit;

performing control to display the image clipped by a clipping unit in the two-dimensional code image display area and to further display a sign indicating in which direction with respect to the two-dimensional code image display area a portion of the two-dimensional code image generated by the generating unit, which is not displayed in the two-dimensional code image display area, exists;

changing, upon receipt of an instruction from a user after the clipped image is displayed by a display control unit, in accordance with the instruction, the lateral length of the two-dimensional code image display area, which is set to be changeable, to be greater than or equal to a lateral length of the two-dimensional code image generated by the generating unit; and performing control to display the two-dimensional code image generated by the generating unit within the two-dimensional code image display area whose length has been changed by a changing unit.

* * * * *